United States Patent [19]

Beauvais et al.

[11] 3,857,979
[45] Dec. 31, 1974

[54] PROCESS FOR TREATING MUSHROOMS

[76] Inventors: Max Beauvais, Saint-Georges-Motel, Eure, France; Robert A. Sindall, Jr., 713 E. Lombard St., Baltimore, Md. 21202

[22] Filed: Mar. 9, 1973

[21] Appl. No.: 339,846

[30] Foreign Application Priority Data
Mar. 24, 1972 France.............................. 72.10429
Jan. 19, 1973 France.............................. 73.01894

[52] U.S. Cl.................. 426/204, 426/509, 426/521
[51] Int. Cl.............................................. A23l 1/28
[58] Field of Search ........... 426/509, 402, 403, 407, 426/204, 399, 401, 404, 418, 521, 486, 506, 509

[56] References Cited
UNITED STATES PATENTS
1,018,909  2/1912  Jacob.............................. 426/302
1,421,750  7/1922  Willison........................... 426/507
3,086,868  4/1963  Keifer.............................. 426/486

OTHER PUBLICATIONS

Chemical Abstracts, Vol. 60, 1964, 6138h, "Some Factors Influencing Mushrooms During Processing."

*Primary Examiner*—A. Louis Monacell
*Assistant Examiner*—Curtis P. Ribando
*Attorney, Agent, or Firm*—Stevens, Davis, Miller & Mosher

[57] ABSTRACT

Mushrooms are imemersed in demineralised water and submitted to the effects of a vacuum.

After the vacuum is released and a further period of immersion in the water, the mushrooms are blanched and sterilised.

8 Claims, 1 Drawing Figure

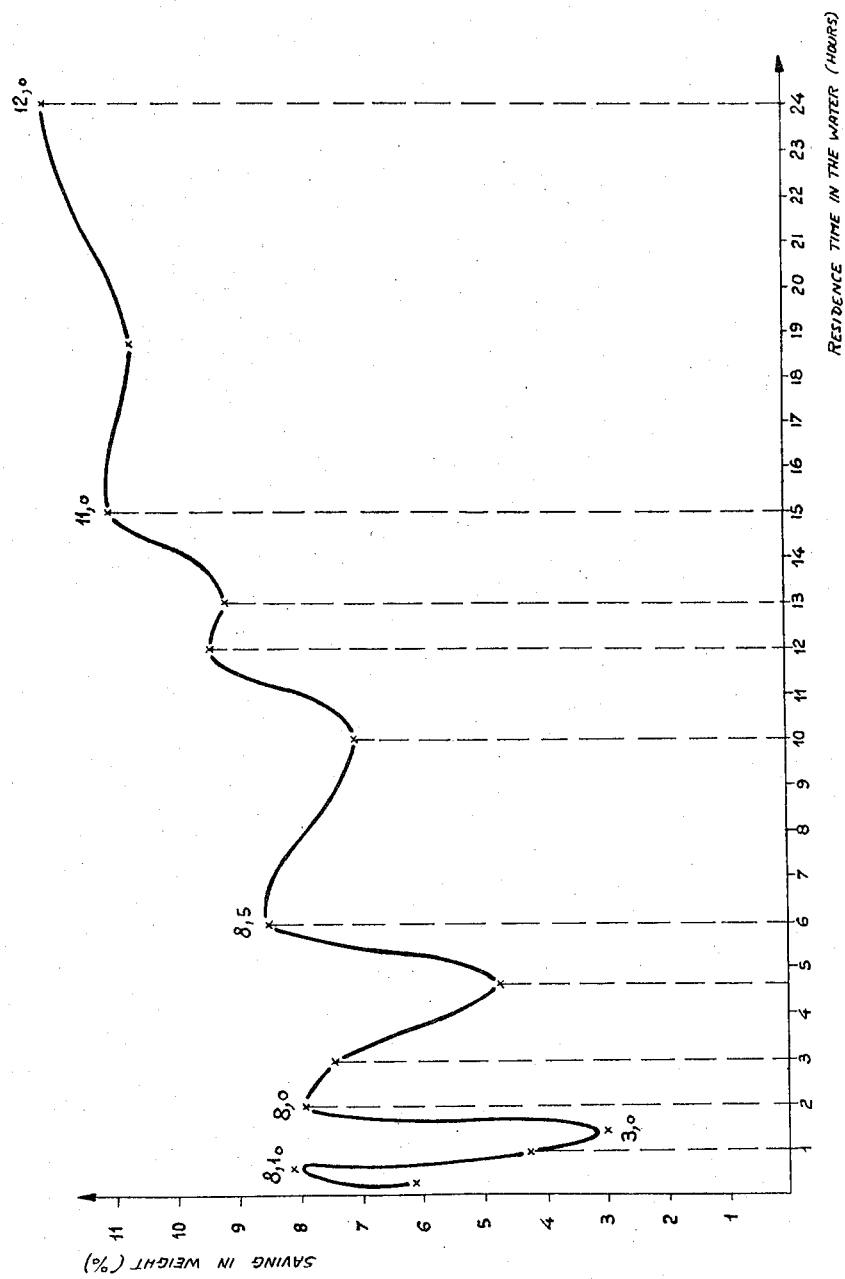

PROCESS FOR TREATING MUSHROOMS

The present invention relates to the treatment of mushrooms and more particularly cultivated mushrooms, with a view to the canning thereof.

Mushrooms intended for canning are usually blanched - that is to say, cooked in steam or boiling water for a few minutes — and then sterilised. During this treatment, they lose their humidity and their weight decreases by about 30 percent.

A principal object of the present invention is to overcome this disadvantage.

To this end, according to the invention, the mushrooms are first of all prepared in the usual manner and then washed in previously demineralised water, i.e., water which still only contains traces of mineral ions, particularly sodium and calcium ions; these mushrooms are then plunged into demineralised water and exposed in this water to a vacuum which is strong but insufficient to cause the water to boil. This vacuum is maintained for a period of time which is preferably of the order of 30 minutes. When the vacuum has been disconnected, the mushrooms are kept in the water for a time of at least 1½ hours.

This vacuum effect and this soaking permit the demineralised water to be fixed in best possible manner in the vegetable cells by difference of osmotic pressure.

After this treatment, the bleaching and the sterilisation may be carried out in the usual way.

The vacuum is preferably of the order of at least 500 mm Hg, and even more desirably at least 600 mm. Best results are obtained when the vacuum is at least 700 mm Hg. It is desirable to increase the vacuum slowly to a maximum value over a period of time, to maintain the vacuum at such maximum value for a further period of time and then to reduce the vacuum again to zero over a third period of time. Preferably these three periods of time are equal or substantially equal in length.

The invention can be carried into effect with very simple equipment, since it is sufficient to have available a container, into which are introduced the demineralised water and the mushrooms, taking care to place above the latter, for example, a perforated plate for the purpose of completely immersing the mushrooms from above, because fresh mushrooms have a tendency to float, and a vacuum vessel which can hold the said container.

The invention is particularly applicable to cultivated mushrooms. It gives particularly interesting results when it is combined with a continuous sterilisation process at high temperature (of the order of 130°C) and of short duration (about 3 minutes). These processes are currently called "HTST" (in English: high temperature short time).

Tests have shown that, in order to obtain the best possible results, it is necessary for the mushrooms to remain in the demineralised water, after breaking off the vacuum, for a period of about 12 to 24 hours.

If, as shown in the graph of the accompanying drawing, the percentage curve of saving in weight of mushrooms treated by the process referred to above is plotted as a function of the residence time in the demineralised water after breaking off the vacuum, relatively to the mushrooms not treated by this process, it is seen that this curve has a sinuous path for the residence times which are between approximately 0 and 12 hours and that, from this time, it rises slowly and tends to be stabilised so as to become approximately parallel to the time axis until 24 hours have elapsed.

The curve represents the mean of the gains in weight as a percentage obtained with mushrooms of various varieties and various sizes, presenting equally various storage times after gathering, as compared with these same mushrooms which have not been treated according to the invention. The variety and the size of the mushrooms, and also the storage time, have only a small influence on this increase in weight.

For the tests, the period of the vacuum treatment was 30 minutes and split up as follows:
   10 minutes from 0 to 750 mm.Hg (10 Torr)
   10 minutes at 750 mm.Hg
   10 minutes from 750 mm.Hg to 0
The temperature of the water was 14°C.

It is desirable for this temperature not to fall below 13°C, otherwise there is danger of the osmotic exchanges being slowed down. Furthermore, it is undesirable for it to exceed 15°C, without fear of bacterial proliferation, having regard to the residence time in the water; the vacuum being able to be slightly stronger, provided that the depression and the restoration to pressure are of a time identical to the residence time under maximum vacuum.

The present invention can be applied to all species of mushrooms.

It is obvious that modifications can be incorporated in the forms which have just been described, particularly by substitution of equivalent technical means, without thereby departing from the scope of the present invention.

What is claimed is:

1. A process for treating an edible mushroom which comprises
   immersing said mushroom in demineralized water at a temperature of 13° to 15°C,
   submitting the immersed mushroom to the effects of a vacuum of at least 500 mm Hg for about 30 minutes,
   releasing said vacuum,
   allowing said mushroom to stand in said demineralized water for at least an additional 12 hours,
   blanching, and
   sterilizing said mushroom.

2. A process according to claim 1, in which said mushroom is allowed to stand in said demineralised water for a period of from 12 to 24 hours.

3. A process according to claim 1, in which the step of submitting said mushroom to the effects of said vacuum includes a first residence time in which the vacuum is built up gradually from zero to a maximum value of 750 mm Hg, a second residence time in which the vacuum is maintained at said maximum value, and a third residence time in which the vacuum is gradually reduced to zero from said maximum value.

4. A process according to claim 3, in which said first, second and third residence times are approximately equal in duration.

5. A process according to claim 4, in which said first, second and third residence times are each approximately 10 minutes in duration.

6. A process according to claim 1, in which the vacuum reaches a value of about 750 mm Hg.

7. A process according to claim 1, in which said mushroom, after blanching, is submitted to a sterilisation step at a temperature of about 130°C for a period of about 3 minutes.

8. A mushroom treated by a process according to claim 1.

* * * * *